United States Patent Office 2,989,405
Patented June 20, 1961

2,989,405
PREPARATION OF EGG PRODUCTS
Jacob L. Stokes, El Cerrito, Calif., and Milo N. Mickelson, Raytown, and Reid S. Flippin, Liberty, Mo., assignors to the United States of America as represented by the Secretary of Agriculture
No Drawing. Filed May 13, 1959, Ser. No. 813,045
7 Claims. (Cl. 99—210)

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has among its objects the provision of novel processes for preparing egg products. A particular object of the invention is the provision of novel fermentation processes wherein the egg material is simultaneously de-sugared and its content of undesirable microbial flora is decreased. Further objects and advantages of the invention will be evident from the following description wherein parts and percentages are by weight unless otherwise specified.

In the commercial drying of eggs it is customary to subject the egg material to a fermentation prior to drying. The purpose of this fermentation is to remove the reducing sugars naturally present in the egg material. Thus it has been shown that the reducing sugars cause deleterious changes including browning and development of undesirable odor and flavor when the dried product is stored. By removal of the reducing sugars these undesirable reactions are avoided and the storage life of the product is greatly enhanced. The process of removing reducing sugars, generally known as fermentative de-sugaring, involves inoculating the egg liquid with a suitable microorganism and incubating the inoculated egg liquid until the reducing sugars are removed. Various microorganisms have been proposed for this procedure including *Saccharomyces cerevisiae, Streptococcus lactis, Lactobacillus leichmanii, Torulopsis monosa, Aerobacter aerogenes*, etc.

In commercial operations the egg material is never sterile but has a variable content of adventitious microbial flora. In many cases the egg material contains salmonella organisms. The presence of these organisms is of course undesirable as they are pathogenic producing the illness known as salmonellosis when ingested by humans in sufficient quantity. A common defect of the prior art fermentative de-sugaring processes is that during the fermentation conditions are suitable for the growth of adventitious organisms. In particular it has been observed that when fermentations are carried out with any of the usual de-sugaring organisms, the salmonella population increases to a large extent. Such an effect is highly undesirable as the salmonella count of the product may be so high as to prohibit its use for human consumption. This effect is demonstrated by the following experiment:

Fresh egg white was divided into a series of 7-ml. samples. To each sample was added about 150 viable cells of *Salmonella senftenberg* per ml. of egg white and inoculated with one species of yeast as designated below. The yeast inoculum consist of washed suspensions of cells which were obtained by culturing for 72 hrs. at 30° on the surface of malt extract agar in a 50 ml. flat prescription bottle. Approximately 0.5 ml. of packed yeast cells were added to each sample of egg white. The inoculated egg white samples were incubated at 350 C. for 72 hrs. to permit dissimilation of glucose and at the end of this period counts were made of the number of salmonella cells. The results are tabulated below—

| Yeast used for de-sugaring | Salmonella content of egg white after 72 hrs., cells per ml. |
|---|---|
| *Candida lipolytica* (NRRL Y-1094) | 12,800,000 |
| *Sacch. carlsbergensis* (NRRL Y-1347) | 15,360,000 |
| *Sacch. fragilis* | 17,920,000 |
| *Candida Krusei* (NRRL Y-301) | 10,880,000 |
| *Candida tropicalis* (NRRL Y-1410) | 2,280,000 |
| *Candida monosa* (NRRL Y-1079) | 15,360,000 |
| Sacch. hybrid | 17,920,000 |
| *Sacch. cerevisiae* 146 | 64,000,000 |
| *Sacch. ellipsoideus* | 14,080,000 |
| *Sacch. cerevisiae* Y-30 | 8,600,000 |
| *Sacch. cerevisiae* Y-567 | 8,320,000 |

In accordance with the present invention, the fermentation is carried out with particular microorganisms which are antagonistic to salmonella organisms. Thereby de-sugaring is attained without increase of the salmonella originally present in the egg material. In fact, the number of salmonella is substantially decreased; in some cases to the point of virtual elimination of these organisms.

The objects of the present invention are attained by fermenting egg material with any of the strains of *Escherichia coli* which are non-pathogenic and which are antagonistic to salmonellae. Various strains of *E. coli* conforming to these requirements have been described in the literature, for example, by Levine et al. (Journal of Bacteriology, vol. 67, pp. 537–541). Typical examples of microorganisms which may be used are *E. coli* strains ATCC–26, NRRL B–2210, NRRL B–2211, NRRL B–2212, and NRRL B–2213. The latter four strains correspond to those designated by Levine as 6–204–55, H–23, H–10, and 1673A, respectively. Of the strains enumerated, NRRL B–2210 is preferred as causing virtual elimination of salmonellae during fermentation.

In carrying out the fermentation in accordance with the invention, the usual steps and conditions as in conventional fermentative de-sugaring are applied with, of course, the exception that an *E. coli* strain having the aforesaid characteristics is used as the fermenting organism. Thus the procedure involves providing a supply of egg liquid, this term being understood to be inclusive of egg white, egg yolk, or mixtures of the two. The *E. coli* organism is then incorporated with the egg liquid and the fermentation carried out. The inoculation may be with a culture of the organism or with cells separated from the other components of the culture. The proportion of cells added may be varied depending on the time desired for the fermentation. Thus the greater the concentration of added cells, the more rapid will be the fermentation. The fermentation may be carried out at temperatures conventionally used for fermentation processes. Generally it is preferred to employ a temperature about from 30 to 38° C. In general, the process will proceed faster with increasing temperature. The fermentation may be carried out at the natural pH of the egg material although it is preferred to lower the pH to about neutrality or somewhat less. Thus the preferred pH range is about 5 to 7. The lowering of the pH of the egg material may be accomplished by adding suitable amounts of any edible acid such as hydrochloric, citric, tartaric, phosphoric, etc. The fermentation is allowed to continue until the reducing sugars are essentially removed. The time required to reach this point depends, as noted above, on such factors as the proportion of added inoculum, temperature, etc. Usually the fermentation is complete in about 6 to 72 hours. In the fermentation the reducing sugars are converted by the *E. coli* into such products as lactic acid, acetic acid, ethanol, succinic acid, carbon dioxide, hydrogen, etc. After the fermentation is completed, the egg material may be dehydrated in conventional manner to be preserved for future use.

As noted hereinabove, a particular advantage of the invention is that salmonella organisms are prevented from multiplying or even eliminated. Other advantages are that the fermentation is achieved without adverse effect on the egg material itself. That is, there is no alteration of the odor, flavor, color, or functional properties of the egg material. The fermented egg products can be used for any purposes for which eggs are used. There is no degradation of protein constituents so that the product can be used in preparing meringues, bakery goods and so forth. This is a surprising result of the invention since it could not have been foretold that the microbial species used herein could effectuate desugaring without adversely affecting the properties of the egg material. A further point is that egg material, particularly egg white, is a notably poor nutrient for microorganisms and it could not have been anticipated that the *E. coli* strains described herein would be capable of proliferation or even of remaining viable in egg liquids. Another advantage of the process of the invention is that during the fermentation the *E. coli* bacteria prevent putrefaction of the egg material by restricting growth of proteolytic organisms naturally present in egg materials.

As noted hereinabove, during fermentation with the described strains of *E. coli*, the salmonella population of the egg material is reduced or at least prevented from increasing. It is not maintained that the fermented product is 100% free from salmonella organisms (assuming that such were present in the original egg material). Thus if it is desired to produce a final product absolutely free from salmonella one may apply a supplementary step to destroy residual salmonella organisms. The additional processing required to achieve such an end can be accomplished readily because of the small content of salmonella organisms in the fermented egg material. That is, the conditions of the treatment that need to be applied are much milder than in situations wherein large populations of salmonella must be destroyed. As a net result the complete extermination of salmonella may be accomplished without damage to the functional properties of the egg material. The processing after completion of the fermentation may involve such procedures as irradiation with ultra-violet light, heat treatment, or other known sterilization technique. A preferred procedure involves addition of hydrogen peroxide to the fermented egg material. For example, enough hydrogen peroxide is added to the fermented egg material to provide an $H_2O_2$ concentration (by volume) of about from 0.3 to 1%, preferably about 0.5%. The peroxide-containing egg material is then held at about 35–40° C. Under these conditions the destruction of salmonella is quite rapid. To ensure sterility, the material may be held under these conditions for a period ranging about from 1 to 24 hours. In this peroxide treatment no preheating to destroy catalase, as has been previously suggested in the art, is used nor is it at all necessary. Elimination of this preheating step is desirable as it avoids any possibility of damage to the functional properties of the treated egg material. Application of the peroxide treatment described above is demonstrated in Examples VI and VII.

The invention is further demonstrated by the following illustrative examples.

It is to be noted that in Examples III, IV, V, and VII, the egg white was deliberately infected with salmonella organisms. This was done to demonstrate the antagonistic effect of the *E. coli* strains. Obviously in applying the process in practice one would not so infect the starting material. The species *Salmonella senftenberg* is used to illustrate the antagonistic effect because this species exhibits the ability to grow well in egg white. In this medium the *senftenberg* species grows much better than, for example, the *oranienburg* and *typhimurium* species.

Example I

A lot of commercial frozen egg white was thawed, adjusted to pH 6.5 by addition of citric acid, and divided into two portions.

A. One portion of the egg white was inoculated with 10% of its volume of a 24-hour broth culture of *E. coli* NRRL B-2210.

B. The other portion of the egg white was inoculated with separated cells instead of a broth culture. That is, an amount of the 24-hour broth culture of *E. coli* NRRL B-2210 equal to 10% of the volume of the egg white was centrifuged and the separated cells were suspended in water and added to the egg white.

The inoculated portions of egg white were fermented at 35–37° C. and analyses were made of the glucose content of the egg white at intervals. The results obtained are tabulated below—

A. GLUCOSE REMOVAL WITH BROTH CULTURE OF *E. COLI* NRRL B-2210

| Time, hrs. | Glucose content of egg white, percent | Proportion of total glucose removed, percent |
|---|---|---|
| 0 | 0.508 | |
| 7 | 0.400 | 21 |
| 24 | 0.237 | 53.3 |
| 36 | 0.187 | 63.2 |
| 48 | 0.095 | 81.4 |
| 72 | 0.020 | 96.3 |

B. GLUCOSE REMOVAL WITH CELLS OF *E. COLI* NRRL B-2210

| | | |
|---|---|---|
| 0 | 0.483 | |
| 7 | 0.393 | 18.6 |
| 24 | 0.34 | 29.7 |
| 36 | 0.235 | 51.5 |
| 48 | 0.165 | 65.8 |
| 72 | 0.02 | 97.0 |

Example II

A lot of commercial egg white was thawed and two portions of it were fermented as set forth in Example I, part A and part B, respectively. Both fermentations were conducted for 72 hours at 35–37° C.

The fermented egg white was then tested according to the procedures described by Slosberg et al. (Poultry Science, vol. 27, pp. 294–301, 1948) to determine its suitability for use in angel food cakes and in meringues. In one part of the test, standard angel food cakes were prepared and the height of the loaves measured as an index of the baking quality of the fermented egg white. In another part of the test, the beating rate of meringues prepared with the products were measured as an index of the aeration quality of the fermented egg white. The results are tabulated below:

FUNCTIONAL TESTS ON EGG WHITE FERMENTED WITH *E. COLI* NRRL B-2210

| Sample | Inoculum used in fermentation | Height of angel food cake, mm. | Rate of beating,[1] ml./g./sec. |
|---|---|---|---|
| 1 | broth culture | 33.5 | 0.0780 |
| 2 | cells | 34 | 0.0735 |
| Control | (not fermented) | 32 | 0.0860 |

[1] Rate of beating is a measure of the increase in specific volume of the foam per second of beating.

Example III

This example illustrates the ability of the NRRL B-

2210 strain of *E. coli* to reduce the population of salmonella regardless of the initial proportion of salmonella and *coli*.

A lot of egg white was adjusted to pH 6.5 by addition of citric acid. The egg white was then divided into several batches and to each was added *Salmonella senftenberg* and *E. coli* NRRL B-2210 in the amounts indicated below. The inoculated egg white samples were then held at 35-37° C. for 72 hours and the number of salmonella organisms determined as described in Example IV.

The results are tabulated below—

| Sample | Original salmonella content, cells/ml. | *E. coli* inoculum, cells/ml. | Final salmonella cells/ml. |
|---|---|---|---|
| 1 | 184 | 2,980,000 | 38 |
| 2 | 196 | 488 | 0 |
| 3 | 50 | ca. 5,000,000 | 5 |
| 4 | 2,800 | ca. 5,000,000 | 42 |

*Example IV*

Fresh egg white was adjusted to pH 6.5 by addition of citric acid and divided into a series of samples. To each sample was added about 400 viable cells of *Salmonella senftenberg* per ml. of egg white and inoculated with one strain of *E. coli* as designated in the table below. Inoculation with the *E. coli* organisms was accomplished by adding to the egg white one percent of its volume of a 24-hour broth culture of the *E. coli* strain in question.

The inoculated samples were then allowed to stand at 37° C. for 72 hours whereby the glucose in the egg white was essentially eliminated. At the end of this period the samples were plated on the Brilliant Green selenite agar medium of Stokes and Osborne (Applied Microbiology, vol. 3, pp. 295-299, 1955) to count the number of salmonella organisms.

The results are tabulated below—

| Strain of *E. coli* | Salmonella content of egg white after 72 hrs. incubation, cells per ml. |
|---|---|
| None (control) | 134,600,000 |
| ATCC-26 | 500 |
| NRRL B-2210 | 0 |
| NRRL B-2213 | 20 |
| NRRL B-2212 | 782 |

*Example V*

The fermentation procedure as described in Ex. IV was repeated using *E. coli* strains NRRL B-2210, B-2213, and ATCC-26. After the 72-hour incubation the glucose content of the fermented samples was determined. The results are tabulated below—

| Strain of *E. coli* used in fermentation | Glucose in fermented egg white, percent | Proportion of the glucose removed, percent | Final pH |
|---|---|---|---|
| NRRL B-2210 | 0.033 | 94 | 5.4 |
| NRRL B-2213 | 0.75 | 86.5 | 5.3 |
| ATCC-26 | 0.1 | 82.0 | 5.2 |

*Example VI*

Commercial egg white was fermented for 48 hours with a broth culture of *E. coli* NRRL B-2210 as described in Example I, part A. After the fermentation, sufficient hydrogen peroxide was added to the egg white to establish an $H_2O_2$ concentration (by volume) of 0.5%. The peroxide-containing egg white was then held for 24 hours at 37° C.

The peroxide treated egg white was then subjected to the baking and aeration tests described in Example II. The following results were obtained: height of angel food cake, 32 mm.; rate of beating, 0.0756 ml. per gram per second.

*Example VII*

Fresh egg white was adjusted to pH 6.5 by addition of citric acid and divided into four portions. Each portion was inoculated with viable cells of *Salmonella senftenberg* in the amount stated below. The salmonella-inoculated egg white portions were then treated as follows—

A. Incubated 72 hours at 35-37° C.

B. Incubated 48 hours at 35-37° C., then enough hydrogen peroxide was added to provide an $H_2O_2$ concentration of 0.5% (by volume), then incubated at 35-37° C. for 24 hours.

C. Inoculated with 1% by volume of a 24-hour broth culture of *E. coli* NRRL B-2210 then incubated 72 hours at 35-37° C.

D. Inoculated with 1% by volume of a 24-hour broth culture of *E. coli* NRRL B-2210 then incubated 48 hours at 35-37° C. At this time enough hydrogen peroxide was added to provide a concentration of $H_2O_2$ of 0.5% (by volume) then held at 35-37° C. for 24 hours.

After the above treatments the four samples were assayed for salmonella by plating on Brilliant Green selenite agar. As a more sensitive test, five 1-ml. portions of the samples were transferred to tubes of Brilliant Green selenite broth medium wherein a positive test for salmonella is indicated by a change in color from green to red.

The results are tabulated below—

| Sample | Fermentation with *E. coli* | Peroxide treatment | Original content of salmonella, cells/ml. | Final content of salmonella (by plating on BGS agar), cells/ml. | Reduction of BGS broth [1] | | | | |
|---|---|---|---|---|---|---|---|---|---|
| A | no | no | 44 | 2,800,000 | + | + | + | + | + |
| B | no | yes | 60 | more than 100,000 | + | + | + | + | + |
| C | yes | no | 195 | 4 | + | + | + | + | + |
| D | yes | yes | 122 | 0 | − | − | − | − | − |

[1] Plus sign indicates presence of salmonella, minus sign indicates absence of salmonella. Each vertical column represents reaction of separate 1-ml. portions of treated egg white.

It is evident from the above table that the combination of fermentation with E. coli NRRL B–2210 and peroxide treatment (sample D) results in complete destruction of salmonella. Treatment with peroxide alone (sample B) is ineffective.

Having thus described the invention, what is claimed is:

1. A process for preparing dried egg products which comprises inoculating egg liquid with a non-pathogenic, salmonella-antagonistic strain of *Escherichia coli*, fermenting the inoculated egg liquid, and drying the fermented egg liquid.

2. A process for preparing dried egg products which comprises inoculating egg liquid with a non-pathogenic, salmonella-antagonistic strain of *Escherichia coli*, fermenting the inoculated egg liquid, treating the fermented egg liquid still containing active catalase with hydrogen peroxide, and drying the so-treated egg liquid.

3. In the process of preparing egg products wherein egg liquid is subjected to a fermentation to remove the reducing sugars normally present in the egg liquid, the improvement which comprises fermenting the egg liquid with a non-pathogenic, salmonella-antagonistic strain of *Escherichia coli*.

4. In the process of preparing dried eggs wherein egg liquid is subjected to a fermentation prior to drying to remove reducing sugars normally present in the egg liquid, the improvement which comprises fermenting the egg liquid with a non-pathogenic, salmonella-antagonistic strain of *Escherichia coli*.

5. A process for eliminating reducing sugars from egg liquid without increase in the population of salmonella organisms adventitiously present in the egg liquid which comprises fermenting the egg liquid with a non-pathogenic, salmonella-antagonistic strain of *Escherichia coli*.

6. The process of claim 5 wherein the strain of *Escherichia coli* is NRRL B–2210.

7. A process for eliminating reducing sugars from egg liquid and eliminating salmonella organisms adventitiously present in the egg liquid which comprises fermenting the egg liquid with a non-pathogenic, salmonella-antagonistic strain of *Escherichia coli* and treating the fermented egg liquid still containing active catalase with hydrogen peroxide.

References Cited in the file of this patent

UNITED STATES PATENTS

| | | |
|---|---|---|
| 1,818,214 | Epstein | Aug. 11, 1931 |
| 2,427,726 | Hopkins et al. | Sept. 23, 1947 |
| 2,474,228 | Coleman et al. | June 28, 1949 |
| 2,593,462 | Kaplan et al. | Apr. 22, 1952 |
| 2,776,214 | Lloyd et al. | Jan. 1, 1957 |

OTHER REFERENCES

"Difco Manual of Dehydrated Culture Media and Reagents for Microbiological and Clinical Laboratory Procedures," 1953, 9th edition, published by Difco Laboratories, Detroit 1, Mich., pp. 84 and 85, article entitled "Egg Meat Medium."

"Bergey's Manual of Determinative Bacteriology," 1957, by Robert S. Breed et al., published by the Williams and Wilkins Co., Baltimore, Md., pp. 336, 337 and 338, article entitled "*Escherichia coli*."